United States Patent [19]
Piret

[11] 3,729,075
[45] Apr. 24, 1973

[54] CONTROL MECHANISM FOR A TRANSVERSE POWER UNIT HAVING AN AUTOMATIC TRANSMISSION

[75] Inventor: Jean Piret, 78 Bougival, France

[73] Assignees: Automobiles Peugeot, Paris; Regie Nationale Des Usines, Billancourt, France

[22] Filed: July 6, 1971

[21] Appl. No.: 160,028

[30] Foreign Application Priority Data

July 10, 1970 France..............................7025796

[52] U.S. Cl...................................192/4 A, 188/69
[51] Int. Cl.............................................F16d 67/00
[58] Field of Search..........................192/4 A; 188/69

[56] References Cited

UNITED STATES PATENTS

| | | | |
|---|---|---|---|
| 2,414,388 | 1/1947 | Orr et al. | 188/69 |
| 2,653,689 | 9/1953 | Hasbany | 192/4 A |
| 3,074,513 | 1/1963 | Robinson | 192/4 A X |

*Primary Examiner*—Milton Kaufman
*Attorney*—Burns, Doane, Swecker & Mathis

[57] ABSTRACT

Control mechanism for a power unit having an automatic transmission for interposition between a manually operated selector and a parking brake and a slide of a control. The mechanism comprises a rotatable control bar connected to the selector and fixed at one end to a lever connected by a rod provided with a ramp adapted to cooperate with a pawl for shifting the latter into or out of engagement with a toothed wheel of a parking brake. A spring is interposed between the rod and lever in such manner that the lever shifts the ramp through the medium of the spring to engage the pawl with the toothed wheel. The lever directly acts on the rod in the direction for disengaging the pawl from the toothed wheel. Connecting means connect the lever to the slide.

9 Claims, 5 Drawing Figures

Patented April 24, 1973

CONTROL MECHANISM FOR A TRANSVERSE POWER UNIT HAVING AN AUTOMATIC TRANSMISSION

The present invention concerns control mechanisms for transverse power units having an automatic transmission.

Without entering into the details of the construction of such units employed in automobile vehicles, it will merely be mentioned that they comprise a control which determines, in accordance with a number of parameters, such as the position of the manual control selector, opening of the fuel throttle, speed of the vehicle etc. . . , which speed ratio of the transmission must be engaged. To each position of the selector there corresponds in this control a given position of a distributor slide, and a linkage transmits to this slide the movement imparted to the selector by the user. Such a linkage may comprise, for example, a selecting lever which is pivotably mounted on a fixed part of the vehicle, a cranked rod contained in a vertical plane roughly parallel to the longitudinal axis of the vehicle and pivoted at one end to the lower part of the lever and at its other end to an arm integral with a control bar, this bar extending through a part of the case of the power unit and to the vicinity of the control located in the lower part of this case.

It is also known that such power units having an automatic transmission are provided with a parking brake which usually comprises a gear wheel keyed to the output shaft of the power unit and a pawl pivoted to the case and biased away from the gear wheel by resiliently yieldable means. This parking brake is also controlled by the selecting lever and the present invention more particularly concerns a mechanism whereby the aforementioned control bar actuates both the slide of the control and the pawl of the parking brake.

There are known arrangements for performing these two functions. However, all these known devices have a number of drawbacks which render them practically useless in a transverse power unit which must satisfy particularly severe requirements, particularly as concerns overall size. Indeed, in such an unit when the hydraulic control is secured to the lower face of a part of the unit case, which is the usual arrangement, the actuating mechanism must have an overall size and above all an overall height which is particularly small since the available space under the lower face, determined by the ground clearance of the vehicle, is itself very small.

An object of the invention is to provide a mechanism which is interposed between a control bar connected to a selector lever, and a slide of the hydraulic control and a parking brake pawl, and has a small overall size, is simple in construction and operation and which can therefore be employed in a transverse power unit. This mechanism, the control and the parking brake are disposed in the vicinity of the lower face of a part of the case of the power unit and are covered by an oil sump secured to the case.

According to the invention, this mechanism comprises in combination : a lever integral with the end of the control bar and substantially perpendicular to the control bar, a guide device integral with the case, a rod which is connected to the lever, carries a ramp for actuating the pawl and is guide in the device, resiliently yieldable means interposed between the lever and the rod, the resiliently yieldable means being adapted to intervene in the transmission of movement in the direction for engaging the pawl of the parking brake, coacting abutment means provided on the lever and on the rod respectively for rendering the rod integral with the lever when disengaging the pawl, and connecting means pivoted to the lever and pivoted to the slide of the control unit.

According to another feature of the invention, the pawl carries a lateral tab which extends in a direction roughly parallel to the rod carrying the ramp, the lateral tab acting as a support face bearing on the ramp when the pawl is unengaged.

Two embodiments of this mechanism are provided so as to achieve application of the parking brake for either one of the directions of rotation of the control bar. The fact of providing these two embodiments permits retaining a particularly simple linkage between the control bar and the selector lever.

According to another feature, which results from the particularly small overall size of the mechanism according to the invention, there is provided a single joint plane between the lower face of the case and the oil sump and control, this joint plane being transversely inclined to the horizontal and roughly perpendicular to the direction in which the control bar extends.

Further features and advantages of the invention will be apparent from the ensuing description with reference to the accompanying drawings.

In the drawings:

FIG. 1 shows a power unit M disposed transversely with respect to the longitudinal direction of the vehicle and comprising in its lower part a control B and a parking brake device F which are controlled by a selector lever L and covered by a sheet metal sump or cover $b$.

Figure 1:
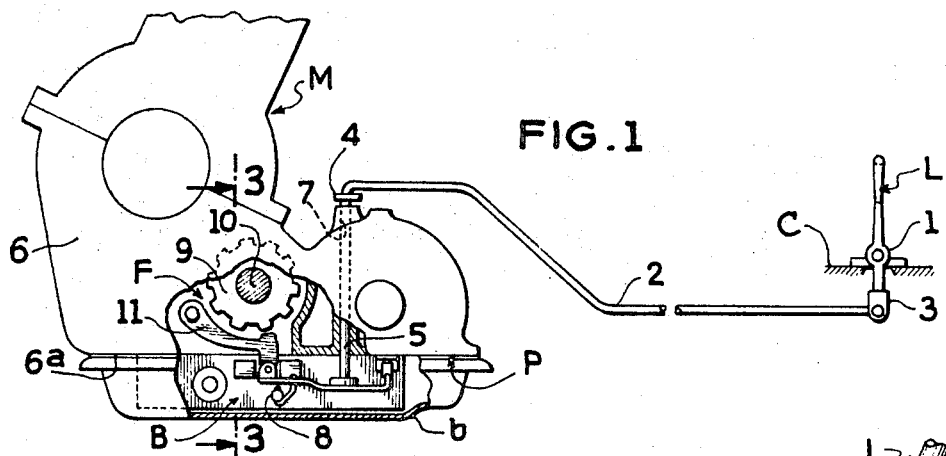
FIG. 1 is a diagrammatic side elevational view, with parts cut away, of a power unit for a vehicle and the linkage provided between the selector lever and the parking brake.

The selector lever L is pivoted at 1 to a fixed part C of the vehicle and a linkage 2 is pivoted to the lower end 3 of the lever and to an arm 4 integral with a control bar 5 which extends through a part of the case 6 of the unit in that it is rotatably mounted in at least one aperture 7 formed in this case.

The control B, secured to the lower face $6^a$ of the case 6, comprises a slide 8 whose position is governed by the position of the selector lever L.

Figure 3:
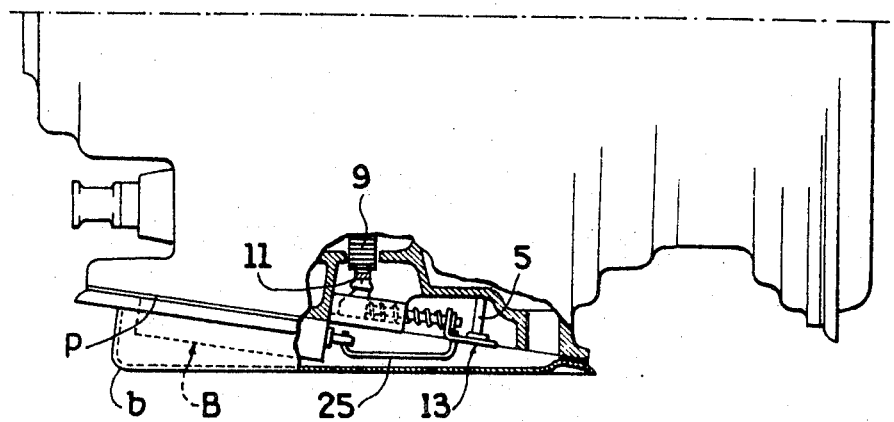
FIG. 3 is an elevational view, partly in section along line 3—3 of FIG. 1.

It will be observed that there is provided a common joint plane P between the lower face $6^a$ of the case and of the control B and the sheet-metal sump $b$, this plane P being transversely inclined to the horizontal as can be seen in FIG. 3.

The parking brake F comprises a toothed wheel 9 keyed on an output shaft 10 of the unit and a pawl 11 which is pivoted to the case and biased by resiliently yieldable means 12 in the direction for moving it away from the ratchet or toothed wheel 9.

There will now be described with reference to FIG. 2 a first embodiment of the mechanism whereby it is possible to actuate by means of the control bar 5 the slide 8 of the control B and the pawl 11 of the parking brake.

This mechanism comprises a lever 13 integral with the end $5^a$ of the control bar 5, this lever being of pressed metal and having a first branch 14 at the end of which is provided a tab 15, a second branch 16 slightly offset with respect to the first branch 14 at the head of which is formed a flange 17 provided with notches 18.

A rod 19 carrying at one end a ramp 20 is slidably mounted in an aperture 21 formed in the tab 15, this rod carrying at its end opposed to the ramp a washer 22 retained against the tab 15 by any suitable means such as a pin. A compression coil spring 23 is disposed around the rod 19 between the part thereof forming the ramp and the tab 15. A U-section guide device 24 is fixed, for example by three screws, to the lower face $6^a$ of the case.

Pivoted to the branch 14 in the vicinity of the free end of the latter, is a connecting means in the form of a link 25 having two branches of unequal length. The link 25 is pivoted at its opposite end to the end of the slide 8. The intermediate branch of the link 25 is roughly parallel to the bottom of the sump $b$.

The notches 18 in the flange 17 are adapted to cooperate with a roller 26 carried at the end of a spring strip 27 which is secured at its other end to the lower face of the case. The roller and notches constitute ratchet means which determine with precision the various positions that the mechanism can occupy.

The pawl 11 has a lateral lug 28 which extends in a direction roughly parallel to the rod 19 this lug being adapted to bear against the ramp when the pawl is maintained in the withdrawn position by the spring 12.

The mechanism just described operates in the following manner:

When the control bar 5 is made to turn about its axis, the lever 13 also turns and if it is assumed that this lever turns in the direction of arrow $F^1$ (FIG. 2) in which it tends to engage the parking brake, the movement is transmitted at the end of this lever to the rod 19 through the spring 23. This interposition of the spring 23 is necessary should the pawl 11 fail to engage exactly in a recess between two teeth of the ratchet wheel. In this case, the spring 23 becomes compressed and the pawl, thus urged by the ramp in a resilient manner, engages in such a recess after a slight rotation of the output shaft 10. Before it is displaced by the ramp 20, the lug 28 bears against the ramp 20 and thus precludes any upward movement of the ramp.

The rotation of the control bar 5 and lever 13 causes the slide 8 of the control to move. The various successive positions of the slide 8 and the position of the parking brake in its applied state are determined by the engagement of the roller 26 in the notches 18.

Owing to the inclination of the joint plane P (FIG. 3) and to the particular construction of the mechanism according to the invention, the overall size of this mechanism in all its positions is particularly small. As the rod 19 and the ramp 20 are solid, their vertical size can be reduced relative to that of a mechanism comprising for example a hollow tapered ramp which is slidable on a coaxial rod. Its resistance to buckling is also increased. The shape of the link 25 interconnecting the lever 13 and the slide 8 is also particularly advantageous. Bearing in mind that the intermediate branch of the link is roughly parallel to the bottom of the sheet metal sump $b$, this link is movable to its two extreme positions and yet it takes up a very small amount of space in height.

In the embodiment just described, the parking brake is applied by pulling on the selector lever L. If it is desired that this brake application be achieved by a pushing action, which is usually the case, it is sufficient to adapt a movement reversing device between the selector lever and the rod 2. If it is preferred to apply the parking brake by shifting the selecting lever L towards the front end of the vehicle without, however, modifying the simple linkage shown in FIG. 1, it is well to employ the second embodiment of the mechanism shown in FIG. 4.

Figure 2:
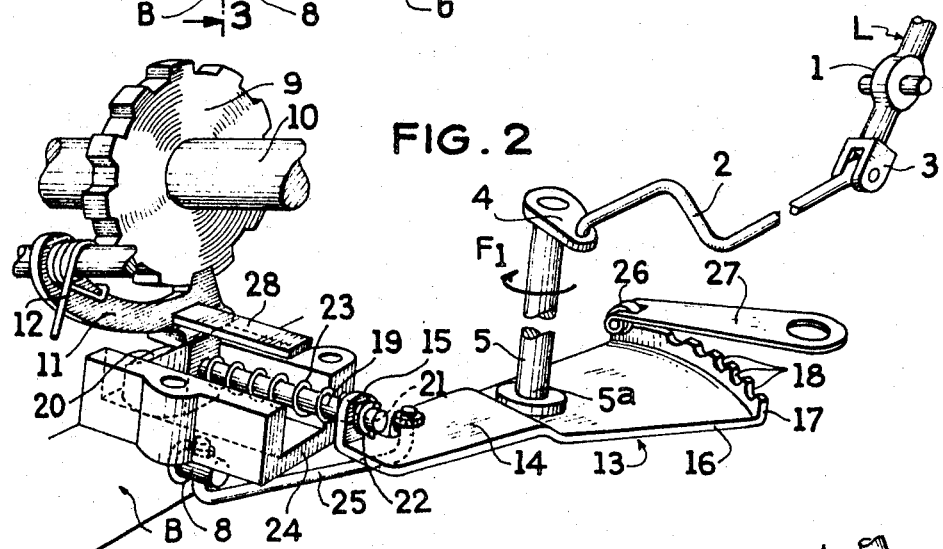
FIG. 2 is a perspective view of a first embodiment of the invention.
Figure 4:
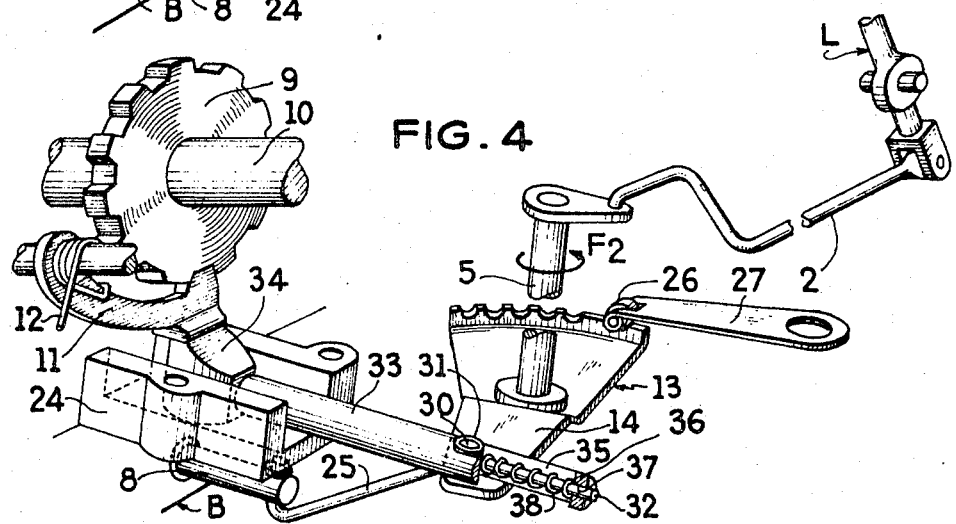
FIG. 4 is a view similar to FIG. 2 of a modification of the invention.

In the embodiment shown in FIG. 4, reference characters identical to those designating similar elements shown in FIG. 2 are employed. The branch 14 of the lever 13 carries a stud 30, on which is mounted a collar 31 carrying a guide stem 32. A rod 33 carrying a ramp 34, adapted to cooperate with the pawl 11, comprises adjacent its end remote from the ramp an elongated aperture 35 and an end wall portion 36 provided with an aperture 37 in which the guide stem 32 extends. This aperture 35 can be formed in a U-shaped member which is brazed or welded to the end of the rod 33 or formed directly in an extension of the rod 33. A coil spring 38 is interposed between the collar 31 and the end wall portion 36. It will be observed that the ramp 34 is inclined in the opposite direction to the ramp of the embodiment shown in FIGS. 1 – 3. The lower part of the pawl can enter the guide device 24 and bear against the rod 33 in such manner as to hold it stationary when the parking brake is not applied and thereby prevent the ramp from making a noise in the guide device.

The mechanism shown in FIG. 4 operates in a similar manner to the mechanism described hereinbefore except that engagement of the parking brake pawl is achieved by a rotation of the control bar 5 in the direction of arrow $F_2$ which corresponds to a movement of the selector lever L towards the front end of the vehicle (FIG. 1).

The overall size and the simplicity of the construction of this mechanism are comparable to those of the first embodiment so that the same advantages are obtained in both cases.

Figure 5:
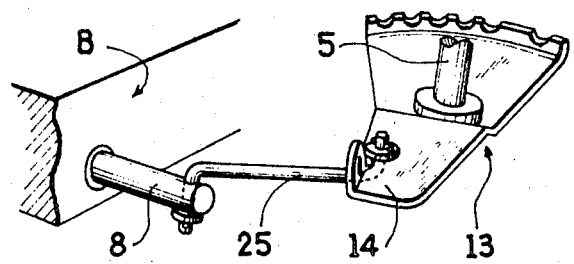
FIG. 5 is a detail view of another modification.

FIG. 5 shows a modification of a detail in which the connecting means or link 25 between the lever 13 and the slide 8 has an S shape so that the overall size in the vertical direction is very small.

Having now described my invention what I claim and desire to secure by Letters Patent is:

1. A control mechanism for a power unit having an automatic transmission, the mechanism being intended for operatively connecting a manually operated selector means to a parking brake toothed wheel and to a slide of a control and comprising in combination: support means, a rotatable control bar carried by the support means, a lever integral with the control bar and substantially perpendicular to the control bar, a guide device supported by the support means, a pawl movably supported by the support means for moving into and out of engagement with the parking brake toothed wheel, a rod guided in the guide device to be movable in a first direction and in a second direction, means defining a ramp carried by the rod and co-operative with the pawl so that movement of the rod in said first direction causes the pawl to engage the toothed wheel and movement of the rod in said second direction causes the pawl to disengage from the toothed wheel, first connecting means connecting the lever to the rod and comprising resiliently-yieldable means interposed between the lever and the rod and adapted and arranged to intervene in transmission of movement from the lever to the rod for movement of the rod in said first direction and coacting abutment means on the lever and on the rod respectively for direct transmission of movement from the lever to the rod for movement of the rod in said second direction, and second connecting means having one end pivoted to the lever and another end for pivotal connection to the slide of the control.

2. A mechanism as claimed in claim 1, wherein the first connecting means and the second connecting means are connected to the lever at neighboring positions on the lever.

3. A mechanism as claimed in claim 2, wherein the lever has substantially the shape of a circular sector having an apex portion and a radiused edge remote from the apex portion, the control bar is fixed substantially in a middle region of the sector, and the rod and the second connecting means are connected in the vicinity of the apex portion of the sector, the mechanism further comprising a flange along the radiused edge of the sector, notches in the flange and stop means adapted to resiliently yieldably engage any one of the notches in the manner of a ratchet arrangement.

4. A mechanism as claimed in claim 1, said abutment means comprising a tab portion on the lever through which which tab portion the rod freely extends, a radial projecting portion on the rod capable of abutting against said tab portion on a side of the tab portion remote from the ramp, said resiliently yieldable means being interposed between the tab portion and the ramp.

5. A mechanism as claimed in claim 1, comprising a stud on the lever, means defining a guide stem having an enlarged portion mounted on the stud, an extension on the rod and an end portion on the extension, an orifice in the end portion, said guide stem freely extending through the orifice, said resiliently yieldable means extending around the guide stem between said enlarged portion of the stem and the end portion of the extension, said coacting abutment means comprising an abutment face on the rod capable of abutting a face on said enlarged portion of the guide stem remote from the end portion of the extension.

6. A mechanism as claimed in claim 1, wherein said second connecting means is a link having a link branch at one end pivoted to the lever and a link branch at another end for pivotal connection to the slide.

7. A mechanism as claimed in claim 6, wherein said link has an intermediate branch portion which is adapted to be substantially parallel to the bottom of an oil sump in which sump the mechanism is intended to be housed, the sump covering the slide of the control and being attached to a lower face of a case of the transmission.

8. A mechanism as claimed in claim 1, wherein said second connecting means is an S-shaped link having one end pivoted to the lever and another end for pivotal connection to the slide.

9. A transverse power unit having an automatic transmission, comprising a transmission case having a lower face, a control unit secured to the lower face of the case, a control bar operatively connected to a manually controlled selector and rotatably mounted in said case, and a mechanism connecting an end of the control bar to the control unit and to a parking brake device, said lower face being transversely inclined to the horizontal and also constituting a joint plane for an oil sump secured to said case.

* * * * *